STABILIZED FULL WAVE SELF-SATURATING MAGNETIC AMPLIFIER

Filed April 23, 1953

Inventor:
Hugh M. Ogle,
by Paul A. Frank
His Attorney.

2,733,307

STABILIZED FULL WAVE SELF-SATURATING MAGNETIC AMPLIFIER

Hugh M. Ogle, Schenectady, N. Y., assignor to General Electric Company, a corporation of New York Application April 23, 1953, Serial No. 350,627
8 Claims. (Cl. 179—171)

My invention relates to magnetic amplifiers, and more particularly to magnetic amplifiers having rectifiers connected in circuit with the load windings of saturable reactor apparatus and capable of delivering electrical energy to a consumption circuit or "load" during each alternation of an interconnected alternating current source. Such magnetic amplifiers are commonly known and herein referred to as "full wave self-saturating magnetic amplifiers."

Such full wave self-saturating magnetic amplifiers are quite sensitive, have fairly good stability and linearity, and also have fairly high speed of response. It is common practice to alter the performance characteristics of the basic full wave self-saturating magnetic amplifier circuits by employing an auxiliary control or "feedback" winding which is energized by current flowing through load. If this auxiliary "feedback" control winding is energized by a signal whose saturation effect opposes that of the primary control winding, degeneration is introduced into the magnetic amplifier by this "negative" feedback signal giving greater stability and a greater range of incremental control to the primary control winding. The degeneration introduced by such negative feedback windings tends to reduce the response time of the magnetic amplifier. If, on the other hand, a "positive" or regenerating feedback signal is supplied to the feedback winding, the magnetic amplifier becomes extremely sensitive but somewhat unstable. Where heavy current is supplied to the feedback winding, one turn, for example, may be insufficient to give the sensitivity desired while two turns may give far too much gain such that the principal control winding loses all control over the circuit. The use of additional resistors to control the amount of degenerating or regenerating current flowing to the feedback winding involves the disadvantage that the response time may be unduly lengthened, and if the resistor is connected in series with the load, this often results in an undesirable dissipation of energy.

Accordingly, an important object of the invention is to provide a full wave self-saturating magnetic amplifier including a degenerative circuit easily controllable to introduce any desired amount of degeneration without any undesirable effect upon the response time of the magnetic amplifier.

Another object of the invention is to provide a full wave self-saturating magnetic amplifier having a degenerative circuit which does not require an auxiliary feedback control winding on the saturable reactor to provide such degeneration.

A still further object of the invention is to provide a full wave self-saturating magnetic amplifier which may be easily adjusted to operate with stability in the region of maximum gain. In furtherance of this latter object, it is an additional object of the invention to provide a degenerative circuit which may be used to control the gain of a self-saturating magnetic amplifier of the type employing a feedback winding with a regenerative signal.

One means heretofore suggested for introducing degeneration into a full wave self-saturating magnetic amplifier without the necessity of an auxiliary feedback control winding is to connect separate resistors in shunt with each of the rectifiers in the alternately conducting branches of the magnetic amplifier. Such plurality of rectifier shunting resistors, however, must be designed or adjusted to have substantially identical value. Otherwise, different amounts of degeneration are introduced into the alternately conducting branches of the magnetic amplifier thereby producing an unwanted alternating current component in magnetic amplifiers designed to deliver unidirectional current to a load and an unwanted unidirectional current component in magnetic amplifiers designed to deliver alternating current to a load. In addition, the resulting unbalanced condition causes the rectifiers in the alternately conducting branches of the magnetic amplifier to sustain different proportions of load current thereby often overloading and destroying one of the rectifiers especially in magnetic amplifiers designed to carry high currents where such rectifiers are normally driven close to their maximum wattage ratings.

Accordingly, a further object of the invention is to provide a magnetic amplifier having a degenerative circuit which inherently and automatically introduces an identical amount of degeneration into each of the alternately conducting branches of the full wave magnetic amplifier circuit, thus equalizing the load carried by the rectifiers in each of these alternately conducting branches.

In general, in accord with the invention an electric impedance, preferably a resistor, is connected between the alternately conducting branches of a full wave self-saturating magnetic amplifier in a location passing a fraction of the current in the conducting branch to the load winding in the non-conducting branch during each alternation of an interconnected alternating current source. Because of this bridge type connection, this impedance is in common series conducting relation with the rectifiers in each branch. The current passed by this impedance to the saturable reactor load winding in the normally non-conducting branch of the magnetic amplifier functions to provide the desired degeneration, as will be more fully explained hereinafter.

The novel features believed characteristic of the invention are set forth with particularity in the appended claims. The invention itself, however, together with further objects and advantages thereof may best be understood by referring to the following description taken in connection with the accompanying drawing in which:

In the various figures similar components are designated by similar reference numerals.

Figure 1:
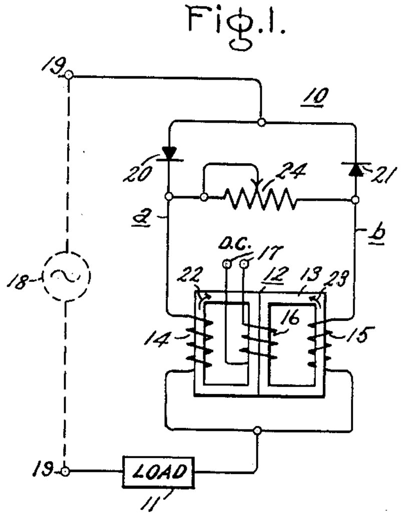
Fig. 1 is a schematic circuit diagram of an alternating current output full wave self-saturating magnetic amplifier embodying the invention.

Referring to Fig. 1, the invention is shown embodied in a full wave self-saturating magnetic amplifier 10 of the type constructed to deliver alternating current to a consumption circuit or load 11. Magnetic amplifier 10 includes a saturable reactor apparatus 12 having a three-legged core member 13 of high magnetic permeability, core 13 has two reactance or load windings 14 and 15 respectively wound on the outer legs thereof and a direct current control winding 16 wound on the central split core leg thereof and connected to direct current input terminal 17. Load windings 14 and 15 are connected in parallel circuit branches *a* and *b* which, in turn, are connected in series with load 11 and an alternating current source 18 connected across alternating current input terminals 19. Reversely poled rectifiers 20 and 21 are respectively connected in circuit branches *a* and *b* to cause current to flow alternately through branches *a* and *b* to load 11 during opposite polarity alternations of an interconnected attenuating current source 18.

The portion of magnetic amplifier 10 comprising the components designated by numerals 12 through 21 constitutes a conventional full wave self-saturating magnetic amplifier which operates in a well-known manner to deliver alternating current to load 11 whose magnitude may be determined and controlled by a unidirectional signal current supplied to control winding 16 through D.-C. input terminals 17. As is well known in such magnetic amplifier circuits, load windings 14 and 15 are wound and connected in proper direction to produce magnetic flux in core 13 having the same direction, as indicated by arrows 22 and 23, relative to the flux produced therein by current in control winding 16. Core 13 thus has a unidirectional component of magnetic flux therein due to the alternately conducting load windings 14 and 15 and appears to be "self-saturating." The magnetic amplifier 10 is referred to as "full wave" since current is supplied to load 11 during both alternations in polarity of the alternating current source 18.

In accord with the invention, an impedance, preferably adjustable in magnitude such as variable resistor 24, is connected between alternately conducting circuit branches *a* and *b* in series circuit relation with the rectifier in the conducting branch and the load winding in the non-conducting branch during each alternation or alternating current source 18. Resistor 24 is also in parallel circuit relation with the non-conducting rectifier through the series connected conducting rectifier. Resistor 24 is thus in series conducting relation with rectifier 20 and load winding 15 during one polarity alternations of source 18 and likewise in series conducting relation with rectifier 21 and load winding 14 during opposite polarity alternations of source 18. Moreover, resistor 24 is in parallel with rectifier 20 when rectifier 21 is conducting and is likewise in parallel with rectifier 21 when rectifier 20 is conducting. Consequently, a leakage current whose magnitude depends upon the value of resistor 24 flows through load winding 15 during practically the same time that substantial load current passes through load winding 14, and a similar leakage current flows through load winding 14 during the alternation that load current normally flows through load winding 15. These leakage currents introduce the desired degeneration into the magnetic amplifier circuit 10. The amount of degeneration introduced depends upon the magnitude of these leakage currents as determined primarily by the relative impedances of resistor 24 and load 11. For most applications resistor 24 will be constructed or adjusted to have a fairly high absolute impedance, for example, considerably above 5000 ohms and to have a relative impedance many times, for example, over 50 times, greater than the impedance of load 11.

The changes in circuit performance and the improved stability resulting from the presence of degenerating resistor 24 is more fully described hereinafter in connection with Fig. 3. The following explanation, however, is offered to explain the degeneration observed when resistor 24 is connected in the circuit, as shown; it being understood that such explanation should not in any way be considered to restrict or limit the scope of the invention.

If we consider the half-wave conducting portion of magnetic amplifier 10 comprising source 18, rectifier 20, one-half of saturable reactor 12 including winding 14, and load 11; it is found, with no signal on control winding 16, that current flows through rectifier 20 and load winding 14 during the latter portion of one polarity alternations of source 18 and that substantially no current flows during opposite polarity alternations as a result of the current-blocking action of rectifier 20. During the initial portion of the load-current-supplying alternation, a strong magnetic field is established in core 13 and drives core 13 far into saturation. During the succeeding opposite polarity alternation during which current is blocked by rectifier 20, the field produced by the previous current in load winding 14 collapses, and core 13 returns to a de-saturated zero signal point on its hysteresis loop. The residual flux remaining in core 13 provides the well-known self-saturating effect of saturable reactor 12. A direct current signal in control winding 16 serves to shift the magnetic flux level to which core 13 returns and thus determines the point or time at which the core saturates during the succeeding load-current-conducting half-cycle. A "positive" signal in control winding 16 induces flux in core 13 which causes the core to approach saturation such that a small increase in voltage across load winding 14 during the succeeding half-cycle drives core 13 into full saturation and allows load current to flow. A "negative" control winding signal has an opposite de-saturating effect upon core 13 retarding the time of saturation and the duration of the load current pulse.

When resistor 24 is connected in the circuit and a small leakage current allowed to flow through load winding 14 during its normally non-conducting period, two main effects occur. Firstly, the leakage current induces magnetic flux in core 13 having a direction opposite to that intially established by the current flowing through winding 14 during its normally conducting period and functions in a manner similar to a negative signal on control widing 16 to reduce the amount of residual magnetization in core 13. This leakage current retards the saturation of core 13 during its succeeding conducting half-cycle so that the absolute magnitude of load current is considerably reduced. Secondly, the amount of desaturating effect introduced by this leakage current varies directly in accord with the duration of the load current pulse and inversely in accord with the time required during the conducting cycle for the core 13 to be driven into saturation which, of course, also corresponds to the time required for the field induced by load winding 14 to collapse. At low values of load current, the time required for the field to collapse during the normally non-conducting half-cycle is quite large and the leakage current has relatively little effect. At higher levels of load current, however, the time required for the field induced by winding 14 to collapse is considerably less, and the leakage current flows over a longer period of the normally non-conducting half-cycle to provide a greater desaturating effect. It is thus apparent that this leakage current provides not only a decrease in absolute amount of load current, but also decreases the slope of the control characteristic thereby introducing true degeneration.

Figure 2:
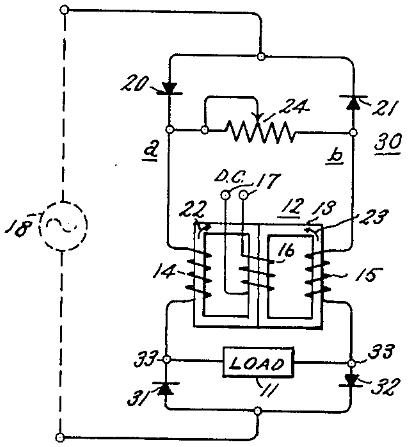
Fig. 2 is a circuit diagram of a direct current output bridge type full wave self-saturating magnetic amplifier embodying the invention.

Referring now to Fig. 2, the invention is shown embodied in a full wave self-saturating bridge type magnetic amplifier 30 similar to magnetic amplifier 10 but having a pair of additional reversely poled rectifiers 31 and 32 connected as balancing arms of the bridge type circuit. Load 11 is connected across the D.-C. output terminals 33 of bridge type magnetic amplifier 30. Adjustable resistor 24 introduces degeneration into magnetic amplifier 30 in the same manner as discussed in connection with alternating current output magnetic amplifier 10 of Fig. 1. Because of the addition of reversely poled rectifiers 31 and 32, direct current flows in load 11 during both alternations of source 18 in magnetic amplifier 30 rather than alternating current.

Figure 3:
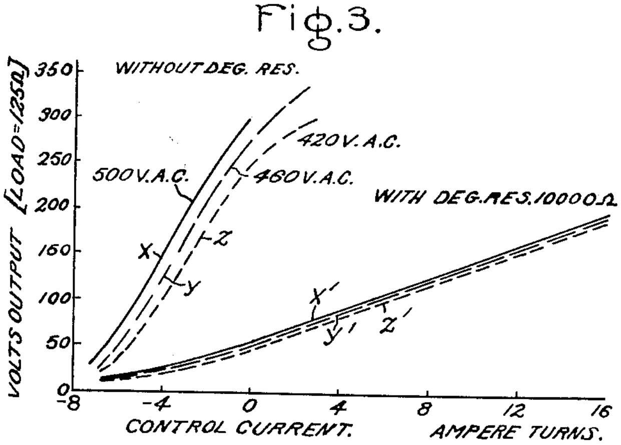
Fig. 3 is a set of comparative control current versus output voltage curves of the magnetic amplifier of Fig. 2 for a number of different alternating voltage sources with and without a degenerative circuit in accord with the invention.

A typical amount of degeneration introduced by the presence of resistor 24 as well as the improvement in stability resulting from such degeneration, is illustrated by the curves of Fig. 3 which were obtained from a magnetic amplifier connected as shown in Fig. 2. In Fig. 3, curves *x*, *y* and *z* represent the control current vs. output voltage characteristic appearing across a 125 ohm load 11 when alternating current sources 18 of 500, 460 and 420 volts respectively are connected to magnetic amplifier 30 and no degenerating resistor 24 is included in the circuit. Curves *x*, *y* and *z* thus represent the normal control current versus output voltage characteristic of conventional bridge type full wave self-saturating magnetic amplifiers when no degeneration is present in the circuit. Curves *x'*, *y'* and *z'* of Fig. 3, however, represent the control current versus output voltage characteristic of magnetic amplifier 30 for source voltages of 500 volts, 460 volts, and 420 volts, respectively, when a degenerative resistor 34 is included in the magnetic amplifier 30 and has a value of 10,000 ohms. As can be seen from the two sets of curves, the degeneration introduced by the presence of resistor 24 makes magnetic amplifier 30 much less sensitive to changes in control current and also improves the stability of the circuit to changes in the amplitude of voltage source 18. Moreover, as indicated by these curves, this degeneration improves the linearity of the control current versus output voltage characteristic.

Figure 4:
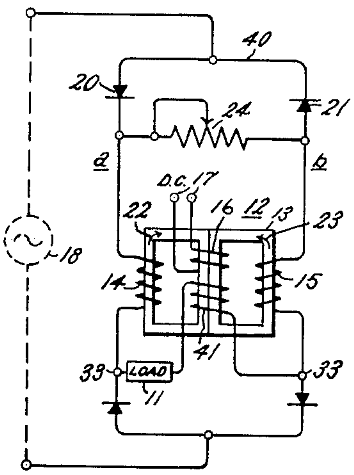
Fig. 4 is a circuit diagram showing the invention embodied in a bridge type full wave magnetic amplifier including a regenerative feedback winding.

Referring now to Fig. 4, the invention is shown embodied in a bridge type full wave self-saturating magnetic amplifier 40 similar to that of magnetic amplifier 30 of Fig. 2 but including a regenerative feedback control winding 41 connected in series with load 11 across the D.-C. output terminals 33 of the magnetic amplifier. As is well-known, the additional control flux introduced by current in this auxiliary control winding 41 increases the sensitivity and efficiency of the magnetic amplifier such that very small changes in current in control winding 16 produce large changes in output load current. It has been found in practice, however, that each turn of the auxiliary feedback winding 41 exerts tremendous effect upon the sensitivity of the magnetic amplifier, especially when the magnetic amplifier is designed to pass considerable current to load 11. Consequently, it is not unusual that although one turn does not contribute sufficient regeneration, two turns may provide far too much regeneration such that control winding 16 loses substantially all control effect. By connecting resistor 24 across the alternately conducting branches *a* and *b* of the magnetic amplifier in accord with the invention, sufficient degeneration may then easily be introduced to adjust the magnetic amplifier to precisely its optimum sensitivity. In other words, by combining the regeneration introduced by positive feedback winding 41 and the degeneration introduced by adjustable resistor 24, it is a simple matter to adjust the performance characteristics of magnetic amplifier 40 to the optimum condition desired for any particular application.

Figure 5:
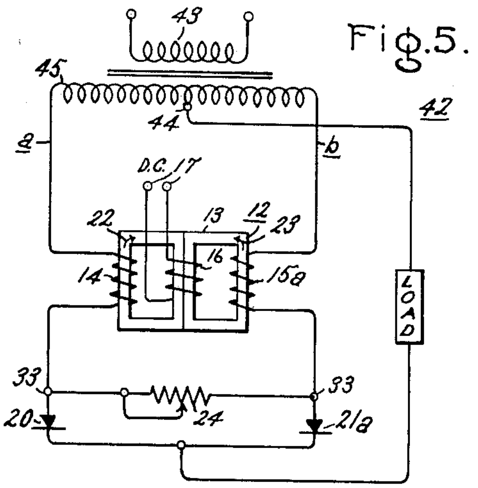
Fig. 5 is a circuit diagram showing the invention embodied in a direct current output full wave self-saturating magnetic amplifier of the type driven by a center tap transformer.

Referring now to Fig. 5, the invention is shown embodied in a full wave self-saturating direct current output magnetic amplifier of the type employing a center tapped transformer as the source of power. Magnetic amplifier 42 is similar to amplifier 10 of Fig. 1 with the exceptions that rectifier 21*a* is poled to pass current in the same direction through load winding 15*a* as rectifier 20 and load winding 14. In order to maintain the same flux conditions in core 13, winding 15*a* is therefore wound in the same direction as winding 14 rather than reversely wound as in amplifier 10. In addition, rectifiers 20 and 21*a* are connected to opposite ends of the tapped secondary winding 45 of transformer 43 through windings 14 and 15*a* while the load 11 is connected to its center tap 44. Degenerating resistor 24 is connected between alternately conducting branches *a* and *b* in the same manner as shown in connection with the magnetic amplifiers of Figs. 1, 2, and 4, and functions in a similar manner to introduce degeneration into the circuit.

It will thus be seen that I have provided full wave self-saturating type magnetic amplifiers with a simple degenerating circuit improving both their stability and range of control. The degeneration affects both alternately conducting branches of the magnetic amplifier equally thereby assuring that no unwanted A.-C. or D.-C. components of load current result due to unbalanced conditions in the circuit. Moreover, the absolute amount of degeneration introduced may be easily adjusted by the simple variation of a single impedance element. In addition, it will be appreciated that, if desired, the primary control winding 16 may be eliminated in each of the above-described magnetic amplifier circuits and control of the output load current accomplished solely by variation of the resistance of resistor 24.

Although I have described above specific preferred embodiments of the invention, many modifications may be made, and it is to be understood that I intend by the appended claims to cover all such modifications as fall within the true spirit and scope of the invention.

What I claim as new and desire to secure by Letters Patent of the United States is:

1. A stabilized full wave self-saturating magnetic amplifier comprising saturable reactor apparatus having two load windings and a feedback control winding, two alternately conductive circuit branches for energizing an electric load, each branch including a separate rectifier and one of said load windings, said control winding being connected for regenerative energization by electric energy delivered to an electric load by said branches, and a resistor connected between said circuit branches in series with the conducting rectifier and in parallel with the nonconducting rectifier during the alternately conducting periods of both circuit branches.

2. A stabilized full wave self-saturating magnetic amplifier comprising saturable reactor apparatus having two load windings and a feedback control winding, an output circuit including an electric load connected in series with said control winding, two alternately conductive circuit branches connected to deliver current to said output circuit, each branch including a separate rectifier connected in series with one of said load windings, and an adjustable resistor connected between said circuit branches in series with the conducting rectifier and in parallel with the nonconducting rectifier through the series-connected conducting rectifier during the alternately conducting periods of both circuit branches.

3. A stabilized full wave self-saturating magnetic amplifier comprising saturable reactor apparatus having two load windings, a pair of rectifiers connected together at one end and each connected at the other end to a different one of said load windings thereby to form two conducting circuit branches, said circuit branches being connected for energization by an alternating current source, an electric load connected to be energized by current conducted by both of said circuit branches, said rectifiers being poled in such a manner that said circuit branches conduct on alternate half cycles of the alternating current source and said electric load device is energized by a unidirectional voltage, and a resistor connected between said other ends of said rectifiers.

4. Stabilized full wave self-saturating magnetic amplifier apparatus comprising saturable reactor apparatus having two load windings; a transformer having a primary winding connected to be energized from an alternating current source and a tapped secondary winding; a first series circuit branch connected across one part of said tapped secondary winding which circuit branch comprises one of said load windings, a rectifier, and a load device; a second series circuit branch connected across another part of said tapped secondary winding which circuit branch comprises the other one of said load windings, a rectifier, and said load device; said rectifiers being poled in such a manner that said circuit branches conduct on alternate half cycles of the alternating current source and said load device is energized by a unidirectional voltage; and a resistor connected between said circuit branches at terminals intermediate said rectifiers and said load windings.

5. A stabilized full wave self-saturating magnetic amplifier comprising saturable reactor apparatus having two load windings, a pair of rectifiers connected together at one end and each connected at the other end to a different one of said load windings thereby to form two conducting circuit branches, said circuit branches being connected for energization by an alternating current source, an electric load and a feedback control winding connected in series with each other between said two conducting circuit branches to be energized by current conducted by both of said circuit branches, said rectifiers being poled in such a manner that said circuit branches conduct on alternate half cycles of the alternating current source and said electric load device and feedback control windings are energized by a unidirectional voltage, and a resistor connected between said other end of said rectifiers.

6. A stabilized full wave self-saturating magnetic amplifier comprising saturable reactor apparatus having two load windings, a full wave bridge rectifier circuit having input terminals connected to be energized from an alternating current source and output terminals, an electric load device connected across said output terminals, each of said load windings being connected in one of two adjacent legs of said full wave bridge rectifier circuit which are connected to a common input terminal, and a resistor connected between said adjacent bridge legs on the side of said load windings which is opposite said output terminals.

7. A stabilized full wave self-saturating magnetic amplifier comprising saturable reactor apparatus having two load windings, a full wave bridge rectifier circuit having input terminals connected to be energized from an alternating current source and output terminals, an electric load device and a feedback control winding connected between said output terminals, said feedback control winding being regeneratively coupled to said saturable reactor apparatus, each of said load windings being connected in one of two adjacent legs of said full wave bridge rectifier circuit which are connected to a common input terminal, and a resistor connected between said adjacent bridge legs on the side of said load windings which is opposite said output terminals.

8. A stabilized full wave self-saturating magnetic amplifier comprising saturable reactor apparatus having two load windings and a feedback control winding, a pair of rectifiers connected together at one end and each connected at the other end to a different one of said load windings thereby to form two conducting circuit branches, said circuit branches being connected for energization by an alternating current source, an electric load device connected in series with said feedback control winding, said electric load device and feedback control winding being connected to be energized by current conducted by both of said circuit branches, said rectifiers being poled in such a manner that said circuit branches conduct on alternate half cycles of the alternating current source and said electric load device and feedback control winding is energized by a unidirectional voltage, and a resistor connected between said other ends of said rectifiers.

References Cited in the file of this patent

UNITED STATES PATENTS

| | | |
|---|---|---|
| 1,997,179 | Logan | Apr. 9, 1935 |
| 2,465,451 | Hedstrom et al. | Mar. 29, 1949 |

OTHER REFERENCES

"Magnetic Amplifiers of the Balance Detector Type" by Geyger, A. I. E. E. Miscellaneous Paper 50-93, December 1949.